United States Patent
Kosaka et al.

[11] Patent Number: 6,005,723
[45] Date of Patent: Dec. 21, 1999

[54] LENS MOVABLE IN A PERPENDICULAR DIRECTION TO THE OPTICAL AXIS

[75] Inventors: Akira Kosaka, Yao; Tetsuro Kanbara, Sakai, both of Japan

[73] Assignee: Minolta Co., Ltd., Osaka, Japan

[21] Appl. No.: 09/037,836

[22] Filed: Mar. 10, 1998

[30] Foreign Application Priority Data

Mar. 11, 1997 [JP] Japan ................................. 9-056106

[51] Int. Cl.⁶ ........................................................ G02B 7/02
[52] U.S. Cl. .............................................. 359/822; 359/813
[58] Field of Search ........................................ 359/694, 697, 359/698, 703, 813, 819, 822, 823

[56] References Cited

U.S. PATENT DOCUMENTS

| | | | |
|---|---|---|---|
| 5,027,147 | 6/1991 | Kaneda | 359/697 |
| 5,173,807 | 12/1992 | Kaneda et al. | 359/698 |
| 5,446,517 | 8/1995 | Murakami et al. | 359/698 |
| 5,742,435 | 4/1998 | Nagashima et al. | 359/696 |

FOREIGN PATENT DOCUMENTS

| | | |
|---|---|---|
| 5-289142 | 11/1993 | Japan . |
| 8-043872 | 2/1996 | Japan . |
| 8-68969 | 3/1996 | Japan . |

Primary Examiner—Georgia Epps
Assistant Examiner—Ricky Mack
Attorney, Agent, or Firm—McDermott, Will & Emery

[57] ABSTRACT

A lens device has a stationary frame, a movable frame supported by said stationary frame so as to be movable in a first direction, a first drive device disposed between said stationary frame and said movable frame to drive said movable frame in a first direction, a lens holding frame to hold a lens element and support said movable frame so as to be movable in a second direction perpendicular to the first direction and a second drive device disposed between said movable frame and said lens holding frame to drive said lens holding frame in a second direction, said movable frame, lens holding frame, and stationary frame being sequential in the direction parallel to the optical axis of said lens element.

14 Claims, 3 Drawing Sheets

LENS MOVABLE IN A PERPENDICULAR DIRECTION TO THE OPTICAL AXIS

BACKGROUND OF THE INVENTION

1. Field of the Invention

The present invention relates to a lens device, and specifically relates to a lens device capable of holding a lens so as to be movable in a direction perpendicular to the optical axis.

2. Description of the Related Art

Heretofore, there have been various types of proposed optical devices provided with a vibration isolating device to correct the image forming position by moving a stated vibration proof lens included in said optical system in a direction perpendicular to the optical axis in accordance with vibration so as to prevent image deterioration generated by vibration of the optical device via unsteady hands or the like.

Normally, in vibration isolating devices constructed so as to move the aforesaid stated vibration proof lens in a direction perpendicular to the optical axis, a movable frame must be driven in a first direction perpendicular to the optical axis relative to a stationary frame, and a lens holding frame which holds said vibration proof lens must be driven in a second direction perpendicular to the optical axis relative to said movable frame. When such a construction is used, the vibration proof lens can be moved independently in said first direction perpendicular to the optical axis and said second direction perpendicular to the optical axis.

Proposed construction of vibration proof lenses include a construction wherein three frames comprising a stationary frame, movable frame, and vibration proof lens holding frame are arranged in the direction of a plane intersecting the optical axis, i.e., a construction wherein a movable frame is arranged within a stationary frame and a lens holding frame is arranged within said movable frame as disclosed in Japanese Laid-Open Patent Application No. 3- 186823. Another proposed construction includes three frames stacked in the direction of the optical axis as disclosed in Japanese Laid-Open Patent Application No. 4-18515.

The former construction disclosed in Japanese Laid-Open Patent Application No. 3-186823, however, is disadvantageous insofar as the diameter of the vibration isolating lens device, i.e., the dimension of the vibration proof lens in a direction intersecting the optical axis of the vibration proof lens, is increased due to the arrangement of the three frames in the direction of a plane perpendicular to the optical axis.

The latter construction disclosed in Japanese Laid-Open Patent Application No. 4-18515, on the other hand, is disadvantageous insofar as the dimension of the vibration isolating lens device is increased in the optical axis direction although the dimension is reduced in the diameter direction of the vibration proof lens due to the stacking of the frames in the direction of the optical axis.

OBJECTS AND SUMMARY

An object of the present invention is to provide a vibration isolating lens device capable of moving a vibration proof lens independently in a first direction intersecting an optical axis and a second direction intersecting an optical axis regardless of the smallness of the dimensions in the optical axis direction and direction perpendicular to the optical axis.

A particular object of the present invention is to reduce as far as possible the dimension in the optical axis direction in a vibration isolating lens device constructed by three stacked frames comprising a stationary frame, movable frame, and lens holding frame.

The previously described disadvantages of the art are eliminated by a vibration isolating lens device comprising:

a stationary frame;

a movable frame supported by said stationary frame so as to be movable in a first direction perpendicular to the optical axis;

a first drive device disposed between said stationary frame and said movable frame to drive said movable frame in a first direction;

a lens holding frame to hold a lens element and support said movable frame so as to be movable in a second direction perpendicular to the optical axis; and a second drive device disposed between said movable frame and said lens holding frame to drive said lens holding frame in a second direction, wherein said movable frame, lens holding frame, and stationary frame are sequential in the optical axis direction.

These and other objects, advantages and features of the present invention will become apparent from the following description thereof taken in connection with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

An embodiment of the vibration isolating lens device 10 of the present invention is described hereinafter with reference to FIGS. 1, 2 and 3.

Figure 1:
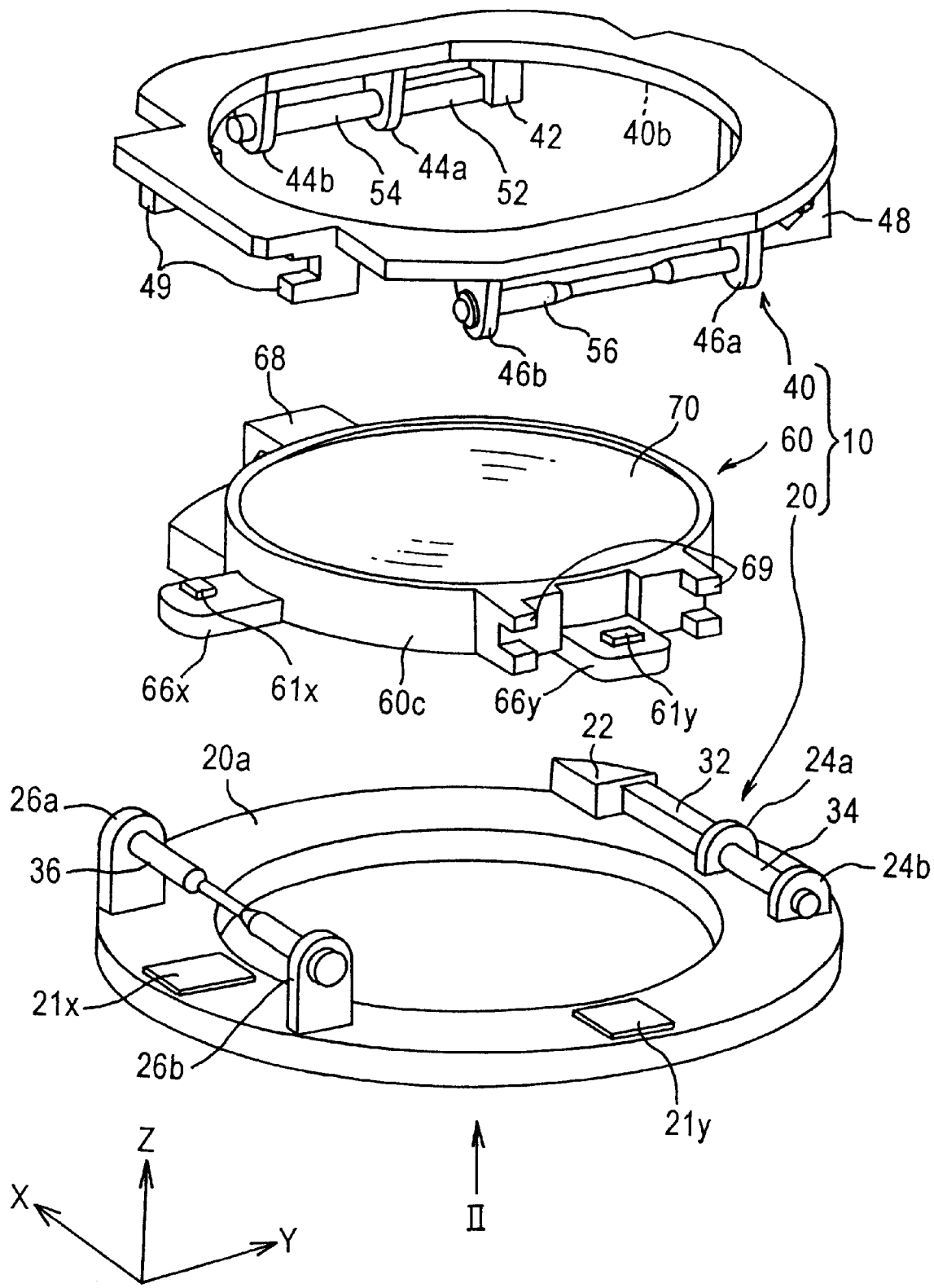
FIG. 1 is an exploded perspective view of an embodiment of the vibration isolating lens device of the present invention.
Figure 2:
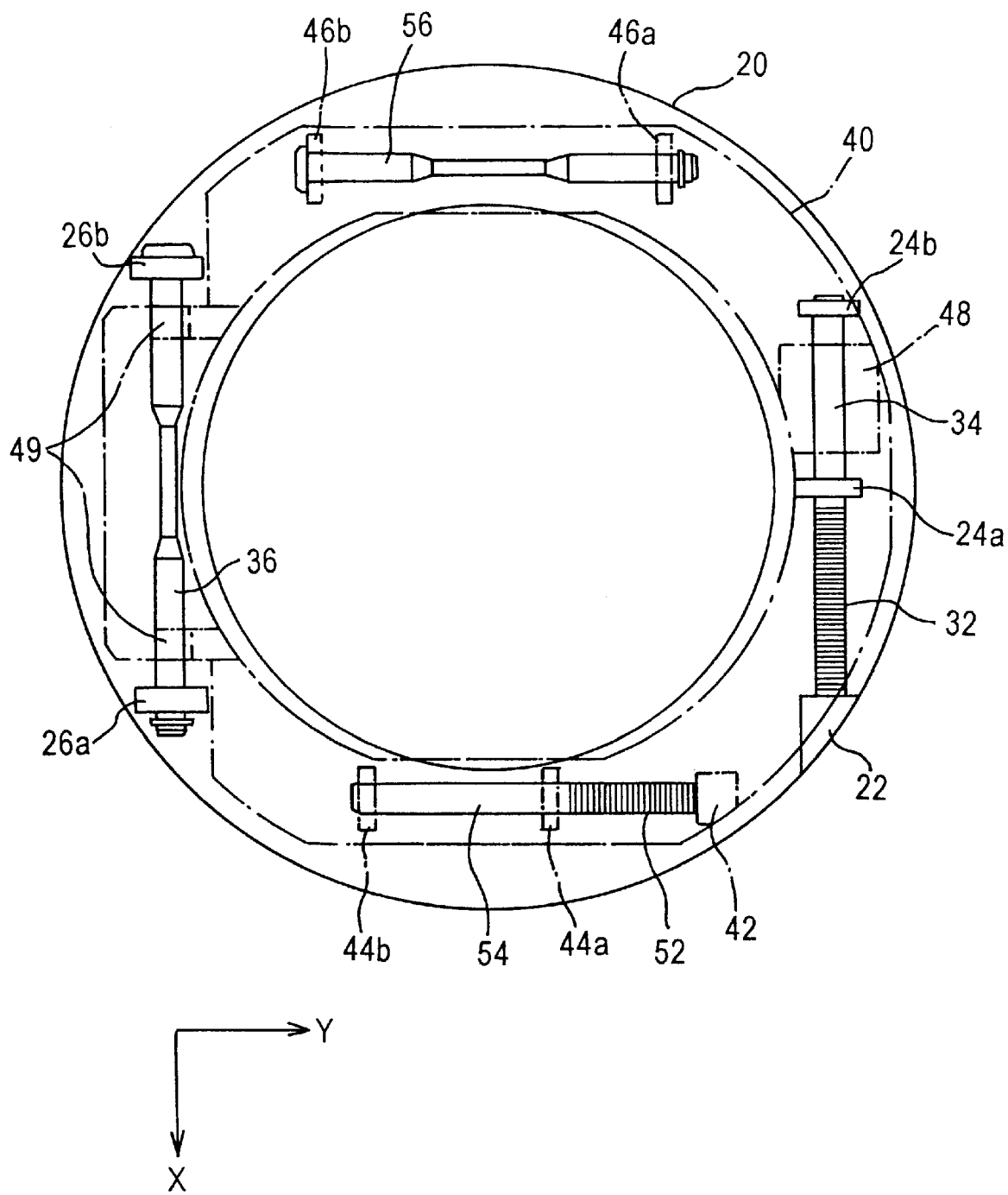
FIG. 2 is a plan view of the essential portion of said embodiment of the vibration isolating lens device of the present invention.

Vibration isolating lens device 10 mainly comprises a stationary frame 20, movable frame 40 arranged opposite said stationary frame 20, and a lens holding frame 60 interposed between said stationary frame 20 and said movable frame 40 as shown in the exploded perspective view of FIG. 1 and the plan view of the essential portion of FIG. 2; vibration isolating lens device 10 is provided with a first drive means between said stationary frame 20 and said movable frame 40, and provided with a second drive means between said movable frame 40 and said lens holding frame 60. The frames 20, 40, 60 are roughly donut-shaped and are essentially equal in shape and interior diameter.

Specifically, on the top surface 20a of stationary frame 20 protrude an element fixing frame 22 anchored to the endface of one end of piezoelectric element 32 extending in a first direction X perpendicular to the optical axis Z, and a pair of rod supports 24a and 24b which support a drive rod 34 anchored to the endface at the opposite end of piezoelectric element 32 such that said rod 34 is freely movable. A pair of driven shaft supports 26a and 26b which support the bilateral ends of a driven shaft 36 extending in the first direction X parallel to the aforesaid drive rod 34 protrude on the opposite side of said top surface 20*a* of stationary frame 20 relative to the optical axis. Photosensors 21*x* and 21*y* are integratedly formed on stationary frame 20 so as to confront the LEDs 61*x* and 61*y* of lens holding frame 60 described later, so as to detect the position of said lens holding frame 60 within a plane perpendicular to the optical axis.

Movable frame 40 is supported on stationary frame 20 so as to be drivable parallel to the stationary frame 20, i.e., in the first direction X, and on the bottom surface 40*b* of movable frame 40 protrude moving element 48 which friction grips the drive rod 34 provided on stationary frame 20, and coupler 49 which oscillatingly engages the driven shaft 36 provided on stationary frame 20. Also protruding on the bottom surface 40*b* of movable frame 40 are element fixing frame 42 anchored to the endface of one end of piezoelectric element 52 extending in a second direction Y perpendicular to the optical axis, and a pair of rod supports 44*a* and 44*b* to support drive rod 54 anchored to the opposite endface of said piezoelectric element 52 so as to be freely movable. Protruding on the opposite side of the bottom surface 40*b* of movable frame 40 relative to the optical axis are a pair of driven shaft supports 46*a* and 46*b* to support the bilateral ends of driven shaft 56 extending in the second direction Y.

The lens holding frame 60 is supported by movable frame 40 so as to be movable parallel to said movable frame 40, i.e., in the second direction Y, and on the exterior surface 60*c* of the cylinder wall supporting the vibration isolating lens 70 comprising one or two lens elements, protrude a moving element 68 to friction grip the drive rod 54 provided on movable frame 40, and coupler 69 which oscillatingly engages a driven shaft 56 provided on movable frame 40. Also provided on the exterior surface 60*c* of lens holding frame 60 are protruding tabs 66*x* and 66*y* which respectively protrude in the first and second directions X and Y perpendicular to the optical axis, and integratedly formed on said tabs 66*x* and 66*y* are photoemitter elements comprising LEDs 61*x* and 61*y*.

In the aforesaid construction, vibration isolating lens device 10 provides a lens holding frame 60 between a stationary frame 20 and a movable frame 40, and provides first and second drive means, i.e., two piezoelectric elements 32 and 52, two drive rods 34 and 54, and two moving elements 48 and 68, shifted 90 degrees and parallel to the optical axis direction Z between said stationary frame 20 and said movable frame 40. Accordingly, the vibration isolating lens device 10 minimizes the dimension in the direction of optical axis Z as far as possible.

In the aforesaid construction, the stationary frame may be anchored at a predetermined position on the optical device provided with said vibration isolating lens device, or mounted on said optical device so as to be movable. Although the stationary frame, movable frame, and lens holding frame ideally have a continuous ring-like shape in a circumferential direction, they may be partially ring-like in the circumferential direction. Since the lens holding frame is disposed between the stationary frame and movable frame, the dimension of the vibration isolating lens device in the direction of the optical axis is determined by the length between said stationary frame and said movable frame. The first and second moving means are disposed between the stationary frame and the movable frame, and may be arranged in parallel to the direction of the optical axis by shifting in the circumferential direction. A first support member supporting said movable frame by said stationary frame, and a second support member supporting said lens holding frame by said movable frame may be arranged on the same side from the movable frame, i.e., parallel to the stationary frame side. The dimension of the vibration isolating lens device can be reduced in the direction of the optical axis by arranging the respective first and second drive means and the first and second support members in parallel in the optical axis direction compared to disposing said first and second drive means in series in the optical axis direction. Accordingly, the dimension can be reduced as far as possible in the direction of the optical axis in a vibration isolating lens device comprising three frames stacked in the optical axis direction.

In the above construction, lens holding frame 60 is driven in two directions X and Y perpendicular to the optical axis Z by an ultrasonic actuator including piezoelectric elements 32 and 52. That is, when power is supplied from a power source (not illustrated) to piezoelectric element 32 provided on stationary frame 20, the drive rod 34 is oscillated in the axial direction, such that the movable frame 40 moves in the axial direction relative to stationary frame 20, i.e., in a first direction X, via moving member 48 of movable frame 40 which friction grips said drive rod 34. Therefore, the lens holding frame 60 supported by said movable frame 40 is driven in said first direction X.

On the other hand, when power is supplied from a power source (not illustrated) to piezoelectric element 52 provided on movable frame 40, the drive rod 54 is oscillated in the axial direction, such that the lens holding frame 60 moves in the axial direction relative to movable frame 40, i.e., in a second direction Y, via moving member 68 of lens holding frame 60 which friction grips said drive rod 54. The driving force at this time is provided by an ultrasonic actuator comprising a continuous displacement type piezoelectric actuator using high frequency oscillation.

So-called piezoelectric linear actuators using an electric field-induced distortion generated by the application of an electric field on a dielectric can be divided those using simple displacement and having a spatial displacement expansion mechanism or directly using microdisplacement elements, and those using continuous displacement which expand by storing displacement over time. Continuous displacement type actuators can be divided into those using a spanworm action to alternatingly and repeatedly clamp and unclamp, and those using an oscillation motor for high frequency oscillation. The aforesaid ultrasonic actuator is of the oscillation motor type.

The device can be designed more compactly and lighter in weight when this ultrasonic actuator is used. Therefore, this vibration isolating lens device can be made more compact than a conventional construction wherein a vibration proof lens is driven by magnetic force using a coil. Furthermore, the aforesaid two actuators may be arranged at mutually perpendicular angles and equidistant from the optical axis. This arrangement provides that the drive device for driving the vibration isolating lens are disposed in mutually perpendicular angles in a chord direction in the donut-like space around the optical axis so as to effectively use said donut-like space around the optical axis in the circumferential direction. Therefore, the dimension of the vibration isolating lens device can be reduced as far as possible in the diameter direction. As shown in FIG. 2, the donut-like space around the optical axis is effectively used by arranging piezoelectric elements 32 and 52 and drive rods 34 and 54, and driven shafts 36 and 56 in chord directions shifted 90 degrees at positions equidistant from the optical axis. Accordingly, vibration isolating lens device 10 provides that the dimension in the diameter direction is reduced as far as possible.

Figure 3:
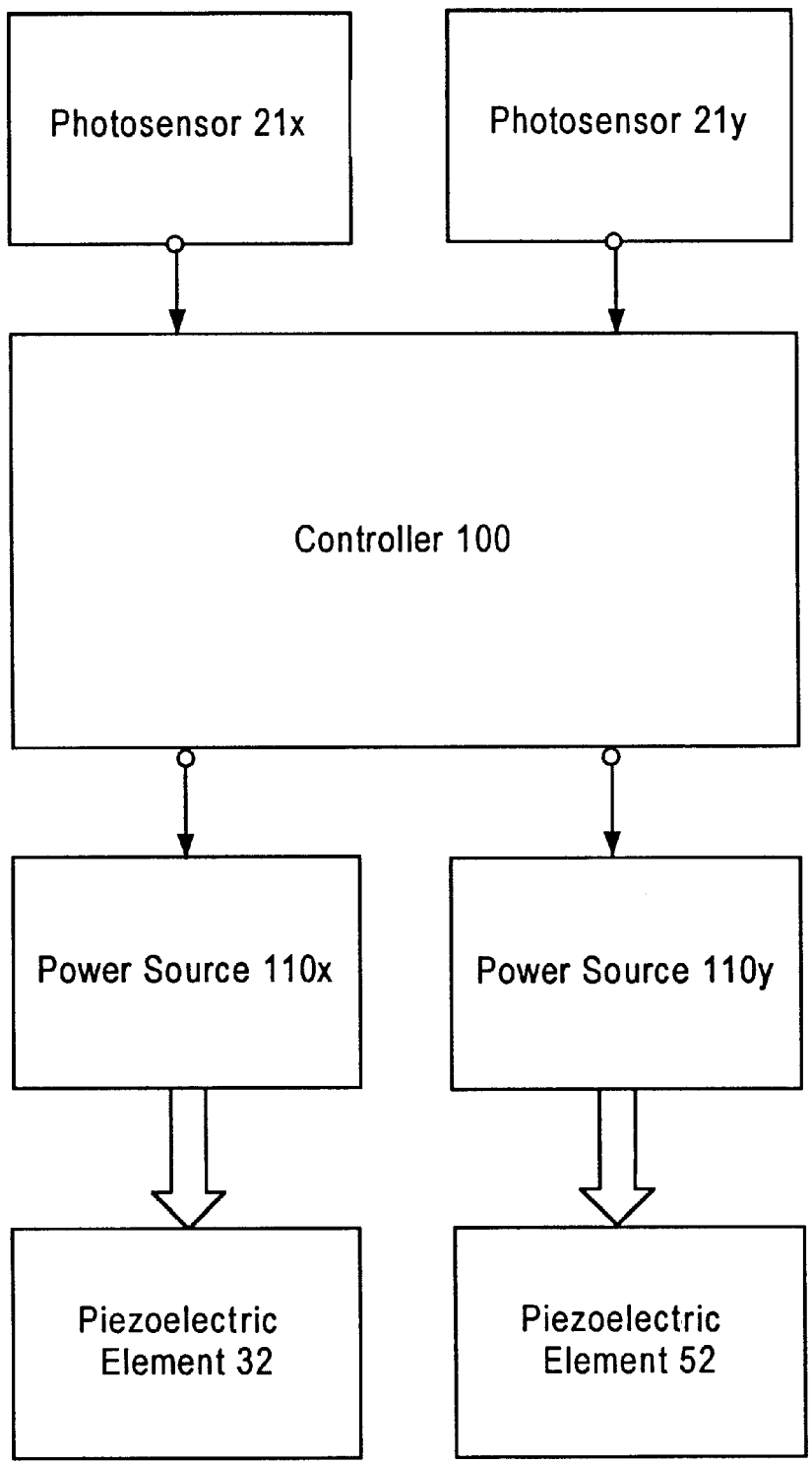
FIG. 3 is the control block diagram of said embodiment of the vibration isolating lens device of the present invention.

FIG. 3 shows the control block diagram of above-mentioned embodiment. In FIG. 3, the photosensors 21x and 21y generate the signal by receiving the light emitting from the LEDs 61x and 61y of the lens holding frame 60. The controller 100 calculates a first moving amount between the lens holding frame 60 and the stationary frame 20 in the direction X and a second moving amount between the lens holding frame 60 and the stationary frame 20 in the direction Y. And the controller 100 outputs the control signal to first and second power source 110x and 110y. The powers are supplied from power sources 110x and 110y to piezoelectric elements 32 and 52 provided on stationary frame 20 and movable frame 40, the drive rods 34 and 54 are oscillated in the axial direction of rods, such that the lens holding frame 60 moves in the desired direction relative to movable frame 40.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A lens device comprising:
a stationary frame;
a movable frame supported by said stationary frame so as to be movable in a first direction;
a first drive device disposed between said stationary frame and said movable frame to drive said movable frame in a first direction;
a lens holding frame to hold a lens element and support said movable frame so as to be movable in a second direction perpendicular to the first direction; and
a second drive device disposed between said movable frame and said lens holding frame to drive said lens holding frame in a second direction,
wherein said movable frame, lens holding frame, and stationary frame are sequential in the direction parallel to the optical axis of said lens element.

2. A lens device as claimed in claim 1, wherein both said first and second drive devices have an ultrasonic actuator comprising a continuous displacement type piezoelectric actuator using high frequency oscillation.

3. A lens device as claimed in claim 1, wherein both said first and second drive devices are disposed in mutually perpendicular angles in a chord direction in the donut-like space around the optical axis of the lens element.

4. A lens device comprising:
a first member;
a second member;
a drive device driving said first member;
a controller controlling said drive device based on a relatively moving amount between either said first member or said drive device, and said second member.

5. A lens device comprising:
a stationary frame;
a movable frame supported by said stationary frame so as to be movable in a first direction perpendicular to the optical axis;
a first drive device disposed between said stationary frame and said movable frame to drive said movable frame in a first direction;
a lens holding frame to hold a lens element and support said movable frame so as to be movable in a second direction perpendicular to the optical axis;
a second drive device disposed between said movable frame and said lens holding frame to drive said lens holding frame in a second direction;
a first controller controlling said first drive device based on a relatively moving amount between said stationary frame and said movable frame; and
a second controller controlling said second drive device based on a relatively moving amount between said movable frame and said lens holding frame,
wherein said movable frame, lens holding frame, and stationary frame are sequential in the direction parallel to the optical axis of said lens element.

6. A lens device as claimed in claim 5, wherein both said first and second drive devices have an ultrasonic actuator comprising a continuous displacement type piezoelectric actuator using high frequency oscillation.

7. A lens device as claimed in claim 5, wherein both said first and second drive devices are disposed in mutually perpendicular angles in a chord direction in the donut-like space around the optical axis of the lens element.

8. A stage comprising:
a stationary frame;
a movable frame supported by said stationary frame so as to be movable in a first direction;
a first drive device disposed between said stationary frame and said movable frame to drive said movable frame in a first direction;
a holding frame to hold an object to be moved and support said movable frame so as to be movable in a second direction perpendicular to the first direction; and
a second drive device disposed between said movable frame and said holding frame to drive said holding frame in a second direction,
wherein said movable frame, holding frame, and stationary frame are sequential in the direction parallel to both first and second directions.

9. A stage as claimed in claim 8, wherein both said first and second drive devices have an ultrasonic actuator comprising a continuous displacement type piezoelectric actuator using high frequency oscillation.

10. A stage as claimed in claim 8, wherein both said first and second drive devices are disposed in mutually perpendicular angles in a chord direction in the donut-like space around the direction perpendicular to both said first and second directions.

11. A stage comprising:
a first member;
a second member;
a drive device driving said first member;
a controller controlling said drive device based on a relatively moving amount between either said first member or said drive device, and said second member.

12. A stage comprising:
a stationary frame;
a movable frame supported by said stationary frame so as to be movable in a first direction;
a first drive device disposed between said stationary frame and said movable frame to drive said movable frame in a first direction;
a holding frame to hold an object to be moved and support said movable frame so as to be movable in a second direction perpendicular to said first direction;
a second drive device disposed between said movable frame and said holding frame to drive said holding frame in a second direction;

a first controller controlling said first drive device based on a relatively moving amount between said stationary frame and said movable frame; and a second controller controlling said second drive device based on a relatively moving amount between said movable frame and said holding frame, wherein said movable frame, holding frame, and stationary frame are sequential in the direction parallel to the direction perpendicular to both said first and second direction.

13. A stage as claimed in claim 12, wherein both said first and second drive devices have an ultrasonic actuator comprising a continuous displacement type piezoelectric actuator using high frequency oscillation.

14. A stage as claimed in claim 12, wherein both said first and second drive devices are disposed in mutually perpendicular angles in a chord direction in the donut-like space around the direction perpendicular to both said first and second directions.

* * * * *

UNITED STATES PATENT AND TRADEMARK OFFICE
CERTIFICATE OF CORRECTION

PATENT NO. : 6,005,723
DATED : December 21, 1999
INVENTOR(S) : Akira Kosaka, et al.

It is certified that error appears in the above-identified patent and that said Letters Patent is hereby corrected as shown below:

Claim 1,
Line 9, change "support" to -- be supported by --.

Claim 5,
Line 10, change "support" to -- be supported by --.

Claim 8,
Line 9, change "support" to -- be supported by --.

Claim 12,
Line 9, change "support" to -- be supported by --.

Signed and Sealed this

Fourteenth Day of August, 2001

*Attest:*

NICHOLAS P. GODICI
*Attesting Officer*    *Acting Director of the United States Patent and Trademark Office*